Sept. 4, 1928.

C. O. SWENSON 1,682,862

MACHINE FOR MAKING CORRUGATED FASTENERS

Filed Oct. 9, 1924 4 Sheets-Sheet 1

Inventor

Carl O. Swenson

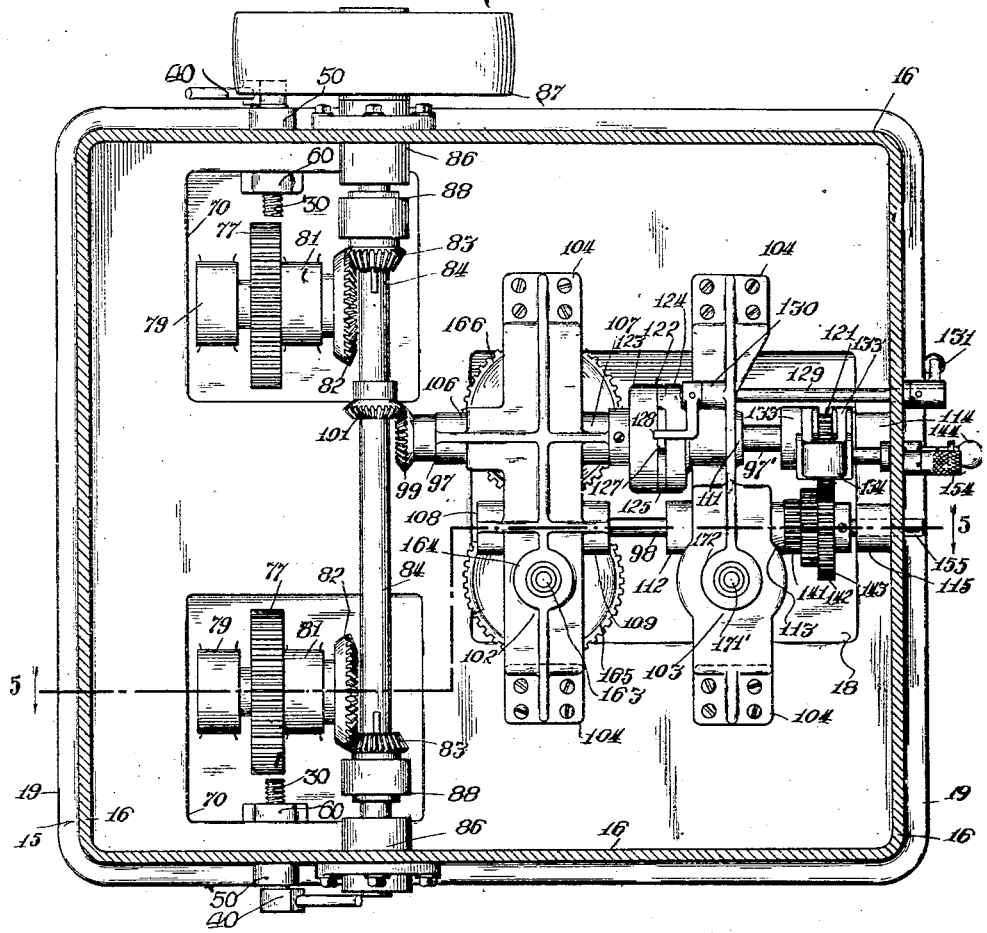

Sept. 4, 1928. 1,682,862
C. O. SWENSON
MACHINE FOR MAKING CORRUGATED FASTENERS
Filed Oct. 9, 1924 4 Sheets-Sheet 3
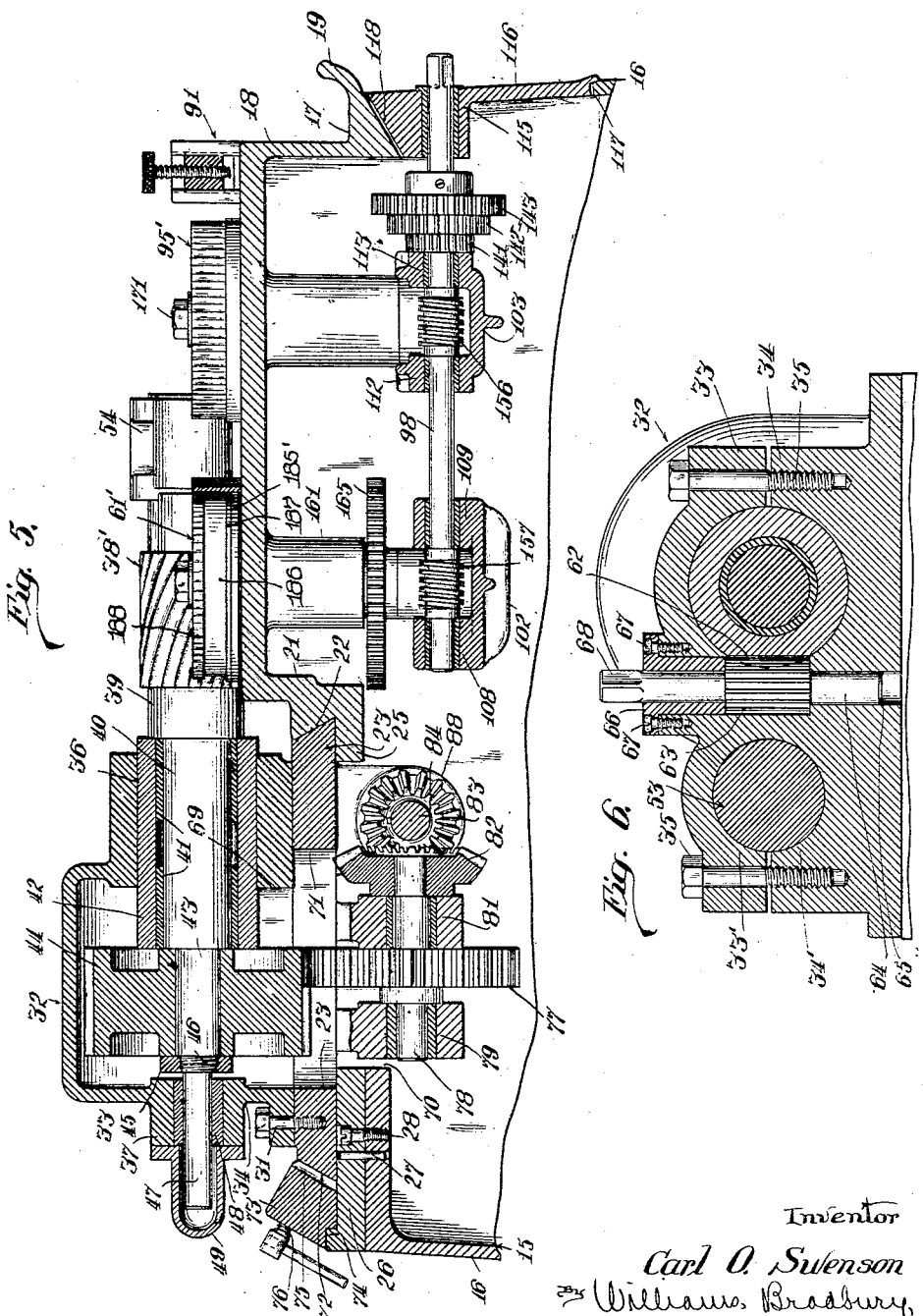
Inventor
Carl O. Swenson
By Williams, Bradbury,
McCaleb & Hinkle,
Attorneys.

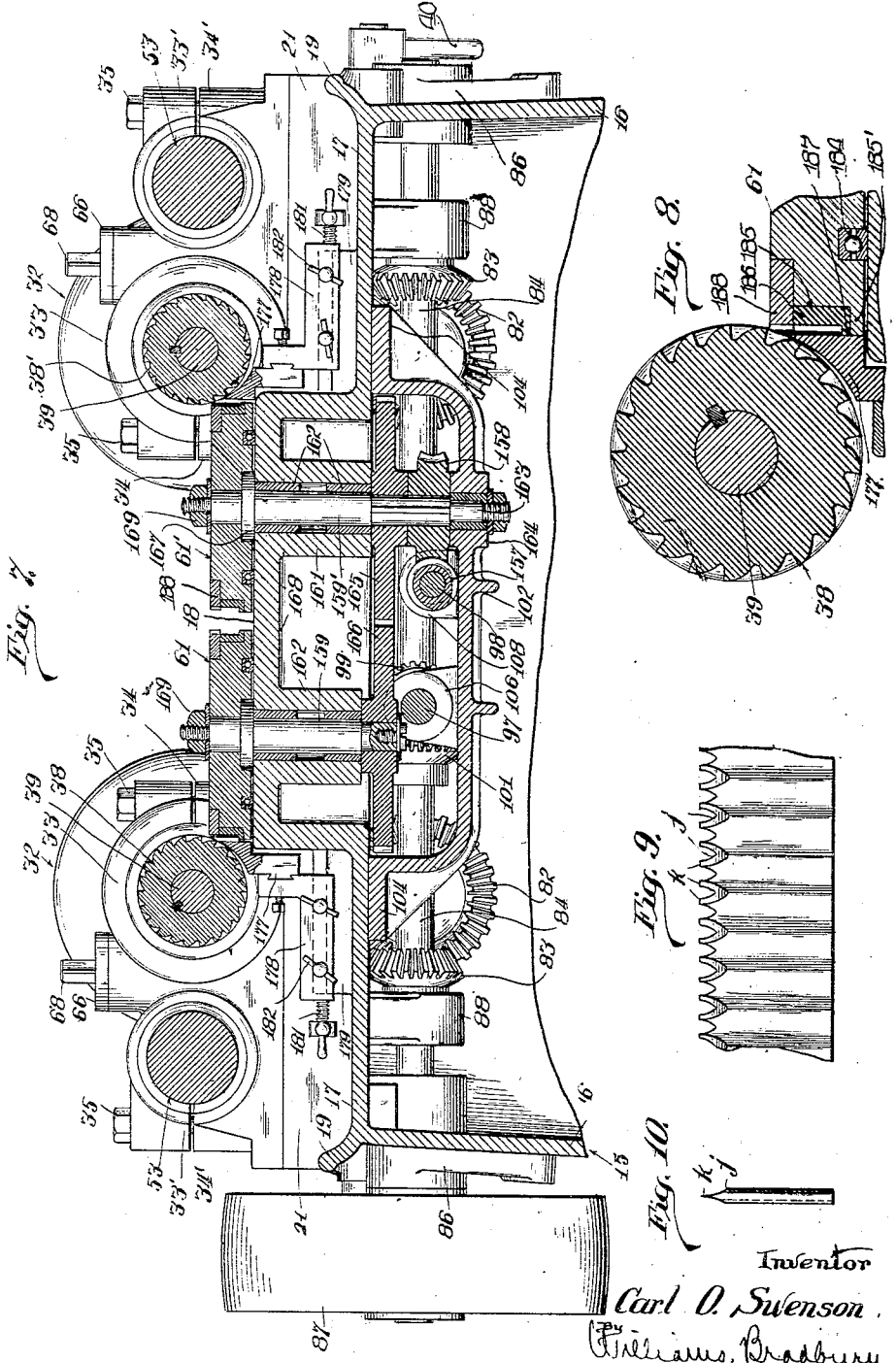

Patented Sept. 4, 1928.

1,682,862

UNITED STATES PATENT OFFICE.

CARL O. SWENSON, OF CHICAGO, ILLINOIS, ASSIGNOR TO CONSOLIDATED STEEL STRAPPING COMPANY, OF CHICAGO, ILLINOIS, A CORPORATION OF DELAWARE.

MACHINE FOR MAKING CORRUGATED FASTENERS.

Application filed October 9, 1924. Serial No. 742,642.

My invention relates to the manufacture of corrugated saw tooth fasteners such as are used in the manufacture of door and window sashes, barrel ends, packing boxes, etc. Generally stated, my invention contemplates the provision of a machine whereby the teeth of such a fastener may be formed by a milling operation which avoids the formation of burrs, or uneven throats between the several teeth of the fastener.

Prior inventors who have been concerned with the manufacture of corrugated saw tooth fasteners apparently have regarded the aforesaid burrs and uneven throats as unavoidable results of attempting to form the saw teeth by a milling operation. The prior art is replate with ways and means for removing or operating upon the burrs and uneven throats after the milling operation has been completed, but nowhere in the prior art do I find any machine which will mill saw teeth on a corrugated strip without leaving such burrs, uneven throats and other irregularities.

The present machine utilizes a new and improved method of forming teeth in the corrugated fastener, which method I have made the subject-matter of a separate companion application Serial No. 742,643, filed Oct. 9, 1924.

Referring to the accompanying drawings illustrating a preferred embodiment of my invention:

Figure 3 is a horizontal sectional view taken through the supporting base and looking upwards;

Figure 4 is a detail sectional view, taken on the plane of the line 4—4 of Figure 2;

Figure 5 is a vertical sectional view taken on the planes 5—5 of Figures 1 and 3;

Figure 6 is a transverse sectional view taken on the plane 6—6 of Figure 1;

Figure 7 is a transverse sectional view taken through the entire machine on the plane of the line 7—7 of Figure 1;

Figure 8 is a fragmentary view in greater detail showing the milling cutter and backing wheel in the performance of a milling operation, and Figures 9 and 10 are side elevational and transverse sectional views, respectively, of the finished fastener strip.

Figure 1:
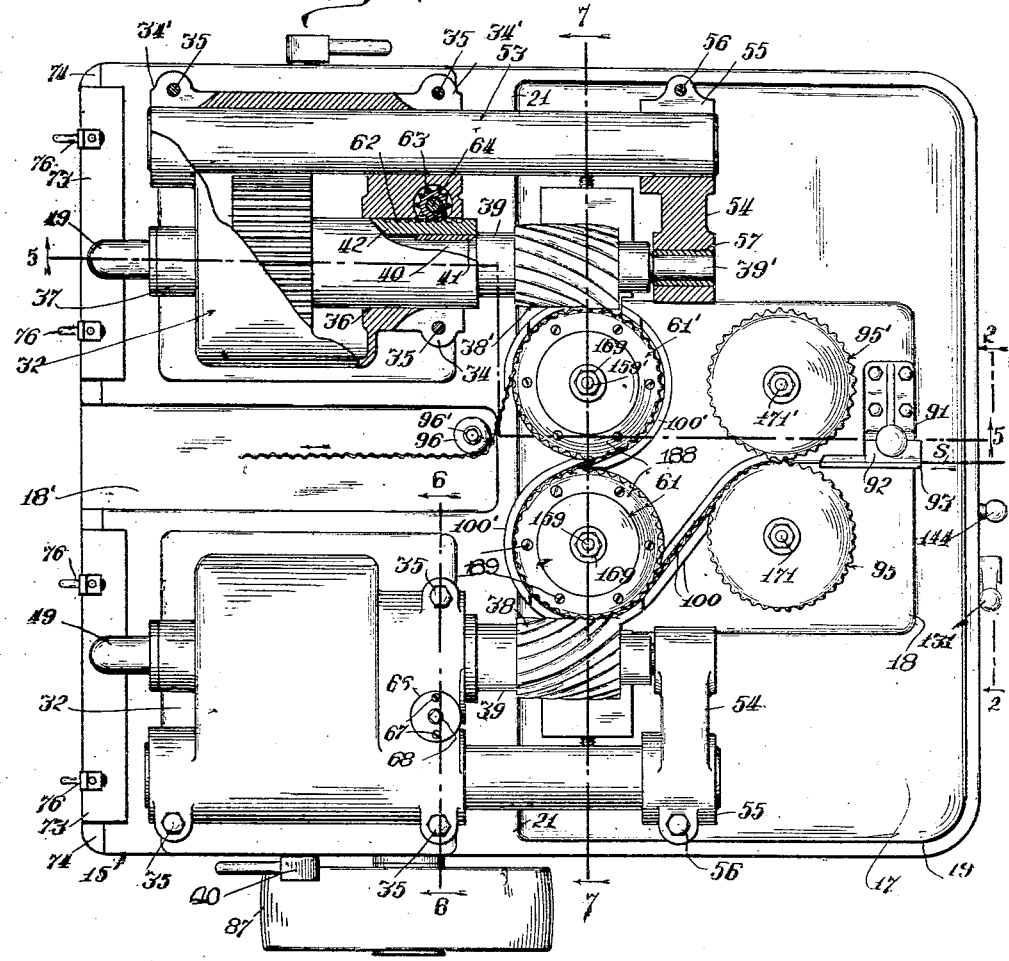
Figure 1 is a plan view of the machine, a part thereof being broken away in section to illustrate some of the details.

The several operating parts are assembled on a supporting base 15, which may be in the form of a rectangular box-like casting comprising side walls 16 provided with a flange around the bottom (not shown) by which the machine may be bolted to the floor; or which may be in the form of an upper table portion supported by legs. For convenience of reference I shall hereinafter refer to the right-hand portion of the machine, viewed from the plane 2—2 of Figure 1, as the front of the machine.

The top of the base casting comprises in the main a flat table surface 17 from which rises an elevated table portion 18 adjacent the front of the machine. A raised flange 19 extends around the front and sides of the table surface to form in effect a pan around the two milling cutters to retain the metal scrap cut in the milling operations. Any suitable arrangement of pockets or air chutes may be employed for carrying away the chips. This marginal flange 19 merges at the sides of the machine into a flange 21 which extends crosswise of the table from side to side thereof and forms the rear wall of the raised table portion 18. This table portion 18 supports the corrugating and backing wheels which I shall presently describe.

The rear side of the transverse flange 21 is formed with a dovetail guide surface 22 for receiving the correspondingly inclined forward edges of two base plates 23 (Figure 5). These base plates are located on the right and left hand sides of the machine, and mount individual bearing supports for the two milling cutters which lie to each side of the raised table portion 18. The forward edges of both base plates rest on the horizontal flange 25, which forms part of the dovetail groove 22, and the rear edges thereof rest on bearing plates 26 secured by pins 27 and screws 28 to the table top 17.

Mounted on the slidable base plates 23, and secured thereto by screws 31 are the movable bearing supports 32 for the two milling cutters. Each bearing support forms a complete mounting unit for its associated milling cutter and arbor and a housing for the gear which drives the cutter. These bearing supports are divided along their inner sides into upper and lower clamping portions 33 and 34 which are adapted to be drawn together by cap screws 35. Formed in each bearing support are front and rear bearings 36 and 37 for mounting the cutter arbor.

The two milling cutters 38—38' are each rigidly mounted on an arbor 39 having a journal portion 40 extending into the front bearing 36. This journal portion is mounted in spaced bearing sleeves 41 which are supported in a shiftable sleeve 42, this shiftable sleeve being non-rotatable in the bearing 36, but having endwise sliding motion therein. At the rear of this journal portion 39 is a reduced portion 43 on which is secured a wide-faced spur gear 44. A nut 45 is screwed over the threaded portion 46 to hold the gear 44 against the shoulder at the end of the journal portion 39 of the arbor. A still smaller reduced portion 47 at the rear end of the arbor has bearing support in a sleeve 48 carried in the rear bearing 37. A cap 49 fits over the projecting end of the arbor portion 47 and closes this end of the bearing.

Referring to Figure 6, it will be observed that the outer side of each bearing support is also divided into upper and lower clamping portions 33' and 34', between which is clamped a section of heavy shaft or circular bar 53. Cap screws 35 also pass down through this side of the casting for drawing the clamping portions 33' and 34' into rigid engagement with this shaft member 53. This shaft is adapted to serve as a shiftable bearing support for the front end of the cutter arbor, and to this end is extended forwardly of the milling cutter for supporting a front bearing bracket 54. This bearing bracket has a split hub 55 which is rigidly clamped to the end of the shaft section 53 by a cap screw 56. A bearing sleeve 57 in the other end of this bearing bracket 54, supports the reduced end 39' of the arbor 39. By loosening the three cap screws 35, the milling cutter arbor 39 and the shaft section 53 can be released for longitudinal sliding motion in their mountings between the clamping portions 33—34 and 33'—34'. This permits the shaft section to slide with the milling cutter when the latter is shifted longitudinally. I shall now describe the purpose and manner of securing this longitudinal shifting of each milling cutter.

The milling cutters 38—38' cooperate with individual backing wheels 61—61' supported above the elevated table portion 18. The corrugated strip is guided around these backing wheels 61—61', as I shall hereinafter describe, and the milling cutters cut first one side and then the other of the strip along its upper edge. In performing this operation, the cutters are disposed substantially intersecting the backing wheels tangentially thereof and consequently only a relatively short length of cutter face is employed. As this portion of the cutter face becomes dull the cutter can be shifted axially to present another portion of its linear face at the point of cutting. Thus, each milling cutter will give a relatively long period of service before removal is necessary. The tightening of the cap screws 35 after an adjustment of the cutter locks the shiftable sleeve 42 and shaft section 53 in rigid position.

For securing this longitudinal shifting motion of each milling cutter, I have provided rack teeth 62 in the outer side of each shiftable sleeve 42. Meshing with these teeth is a long spur gear 63 mounted on a vertical operating shaft 64. This shaft has bearing support below the gear in a bore 65, and above the gear it passes through a bearing cap 66 which is secured to the housing cover 34 by cap screws 67. A squared shank 68 on the upper end of the shaft is adapted for the reception of a suitable wrench by which the milling cutter and the shaft 53 which supports the end bearing can be advanced forwardly or backwardly to any desired position. After the milling cutter has been placed in its forward or desired operating position the cap screws 35 are tightened to rigidly clamp the shaft section 53 and also to clamp the shiftable sleeve 42.

It will be noted from Figure 5 that the wide-faced gear 44, in each milling cutter unit 32, projects down through an opening 69 in the bottom of the supporting unit 32 and into an opening 71 in the dovetailed slide plate 23. These openings 69 and 71 are sufficiently long to accommodate the rectilinear movement of the gear 44 with the shifting of the milling cutter 38'.

In order to gauge the depth of cut of each milling cutter, I have also mounted each supporting unit 32 for a motion transversely of the machine to move each milling cutter 38—38' towards or away from its respective backing wheel 61—61'. This is the purpose of the slidable mounting of the plate 23 in the dovetail groove 22. The opposite edge of the plate 23 also has a corresponding slope 72 adapted to cooperate with a wedge block 73. This wedge block has a right angle recess extending over a right angle shoulder 74 extending along the rear edge of the mounting plate 26. A wedge plate 75 is interposed between the sloped surface 72 and the wedge block 73, and a manually operable screw 76 threading through the wedge block 73 enables a firm clamping pressure to be applied to the wedge plate 75 for holding the supporting unit 32 in any adjusted position in its guide 22.

This lateral shifting of each supporting unit is secured by individual adjusting screws 30 having outer ratchet levers 40, These screws are journalled in bosses 50 on the base casting and screw into bosses 60 depending from the supporting units (Figure 3).

Power is transmitted to each milling cutter through a gear 77 which meshes with the gear 44. The gear 77 is mounted on a short drive shaft 78 which is supported in bearings 79 and 81 on each side of the gear. The gear 77 is confined against lateral movement but owing to the wide face of the gear 44, this latter gear remains in mesh with the gear 77 in all longitudinal positions of the milling cutter 38. On the forward end of each shaft 78 is mounted a bevel gear 82 which meshes with the bevel pinion 83 on the transverse power shaft 84. The bearings 79 and 81 are preferably in the form of hangers depending from the supporting unit 32 through the openings 70 and 71 so that the shaft 78 and gear 77 will move with the unit 32 in any transverse adjustment given this unit in its guide 22.

The play between the bevel gears 82 and 83 will usually accommodate any slight adjustment of the unit 32, or the bevel pinion 83 may be brought into proper mesh with the bevel gear 82 and then rigidly secured to its shaft after such adjustment of the supporting unit 32. It will be noted from Figure 3 that the two bevel pinions 83—83 mesh with opposite sides of their respective bevel gears 82 so as to drive the milling cutters in opposite directions. This gives the desired downward cut by each milling cutter on its particular side of the corrugated strip.

The power shaft 84 has bearing support at its ends in bearings 86 which are bolted in the side walls 16 of the base casting (see Figure 3). At one end, the shaft 84 is extended beyond its bearing 86 for supporting the belt pulley 87 through which power is transmitted to the machine. The shaft 84 may also have additional bearing support in bearings 88 extending downwardly from the slidable plates 23 through the openings 70.

Before describing in detail the drive mechanism for the corrugating and backing wheels, I shall trace the path of the strip through and around these wheels. In its original form, the fastener material consists of a metallic strip "s" which is fed to the front of the machine from a supply reel, not shown. The strip first enters a guide 91 which is bolted to the front edge of the raised table portion 18. This guide comprises a pair of guide jaws 92 and 93. These jaws may be urged together under an adjustable spring pressure, whereby the jaws may function as spring tension means for adjustably tensioning the feed of the strip. From this guide the strip passes between a pair of corrugating wheels 95—95' which are supported above the elevated table surface 18. These wheels have toothed peripheries engaging in a loose mesh to permit the strip to pass therebetween, the teeth being designed to form symmetrical transverse corrugations in the strip. From these corrugating wheels, the corrugated strip is then led to the left, across the table 18 for a partial turn around the first backing wheel 61. The first milling operation is performed while the corrugated strip is "backed up" by this wheel, and while it is moving in the curved path defined by this wheel. From this wheel, the strip is led forwardly around the front of the companion wheel 61'. This latter wheel performs the same function as the first wheel 61 in "backing up" the strip and guiding it in a curved path past the other milling cutter 38', for the performance of the second cutting operation. It will be noted that this second cutting operation is performed on the opposite side of the strip from that cut by the first cutter 38. Both wheels have teeth closely fitting the corrugations in the strip for giving firm support to the reverse side of the strip in each cutting operation. I shall describe these cutting operations in greater detail in the latter part of the description. From the wheel 61' the finished strip is led around an idler pulley 96 and then backwardly from the rear of the machine to a power driven winding reel, not shown. The pulley 96 is pivoted at 96' to a continuation 18' of the raised table portion 18. Appropriate guides 100 and 100' may be extended between the wheels and around the peripheries of the wheels for guiding the strip, if desired.

Referring now to the drive mechanism for driving the corrugating and backing wheels, attention is first directed to Figure 3. It will be noted that extending forwardly from the power shaft 84, below the top of the base casting, are two parallel shafts 97 and 98. The first shaft 97 carries a bevel gear 99 which meshes with a bevel gear 101 on the power shaft 84. Both shafts 97 and 98 having bearing support in two bearing hangers 102 and 103 which extend crosswise of the machine, and which have feet 104 bolted or screwed to the underside of the table top 17. The rear hanger 102 has spaced bearing arms 106 and 107 for the first shaft 97, and also has spaced bearing arms 108 and 109 for the second shaft 98. The front hanger 103 has a single bearing 111 for the first shaft 97, or its continuation 97', and has two spaced bearings 112 and 113 for the second shaft 98. The forward ends of both shafts also extend through bearings 114 and 115 formed in a removable front plate 116. This front plate sets in an opening 117 in the front wall 16 of the base casting, the top of the plate having an inclined upper edge 118 engaging against a companion edge at the top of the opening (Figure 5).

The second shaft 98 has a direct geared connection with the corrugating and backing wheels, and is in turn driven from the shaft 97 through any suitable arrangement of gearing. For example, a gear fixedly mounted on the shaft end 97' may have permanent driving engagement with a gear fixedly mounted on the shaft 98 for a continuous drive of the latter at a speed of fixed ratio relative to the speeds of the other parts of the machine. As an alternative arrangement, it may be desirable in some instances to be able to change the ratio of the "feeding" speed of the strip relative to the "speed" of the cutters through one or more changes. For this situation I contemplate interposing a system of change feed gearing 101 between the driving shaft 97 and the driven shaft 98. By the provision of this change feed gearing the feeding rate of both the corrugating and backing wheels can be varied through a plurality of steps relative to the speed of the cutters.

Any suitable clutch may be employed for controlling the operation of the machine. For example, the clutch may be associated with the driving pulley 87, or interposed in the shaft 84 between this pulley and the first gear 83 so that disengagement thereof will stop operation of the milling cutters and the feeding wheels. Or the clutch may be interposed in the shaft 97 so that disengagement thereof will stop operation of the corrugating and backing wheels but will leave the milling cutters running. As illustrative of the latter location I have shown a clutch 122 interposed in the first drive shaft 97 on the power side of the change feed gearing, when such gearing is employed.

Any suitable design of clutch may be employed, such as a friction clutch, an overrunning roller clutch, etc., that shown in Figure 4 being an overrunning roller clutch. This form of clutch generally comprises a driving element 123 and a driven element 124 with suitable interposed clutching means adapted to carry the overrunning rollers. The shaft 97 terminates at this clutch, a continuation thereof 97' extending forwardly through the bearing 111 for effecting driving connection with the change feed gearing 121. The clutch member 123 is keyed to the rear shaft portion 97, and the clutch member 124 is keyed to the front shaft section 97'. A stop finger 127 projects from the periphery of a control element 125 which controls the operation of the clutch, this finger being adapted to strike a stop arm 128 when the latter is swung into the path of the stop finger 127. This stop arm 128 is fixed to the end of a clutch operating shaft 129, which extends forwardly through the removable front plate 116 and has bearing support in this plate and in a bearing 130 carried by the hanger 103. An operating lever 131 is secured to the front end of this control shaft, and it will be apparent that by the oscillation of this lever the drive to the corrugating and backing wheels may be interrupted or connected at any time.

Where the change feed gearing 121 is employed, the same comprises a spur gear 132 which is mounted on the shaft extension 97' between the hubs 133 of a yoke 134. This yoke is free to swing concentrically of the shaft 97'. Extending through bearing hubs in the lower end of this yoke is a shaft 135 on which is journalled, between the arms of the yoke, a gear 136 which meshes with the gear 132. The shaft 135 is secured fast in the yoke 134, and extends forwardly through an arcuate slot 137 in the removable front plate 116. Driving connection between the shaft section 97' and the gear 132 is established through a long key 138 engaging in a key slot in a driving sleeve 139. The gear 132 is compelled to rotate with this driving sleeve 139, but the yoke 134 is free to swing on the driving sleeve. The key and driving sleeve thus maintain driving connection with the gear 132 when the yoke and gear are slid endwise along the shaft 97' in making the different gear selections which I shall now describe.

Mounted on the other shaft 98 are three spur gears 141, 142, and 143 of suitably graduated sizes. When it is desired to transmit a relatively slow rotative speed to the corrugating and backing wheels, the gear 136 is placed in mesh with the large gear 143. For higher rotative speeds, the gear 136 may be placed selectively in mesh with either of the gears 142 and 141. Obviously, the number of speed selecting gears may be increased or diminished to suit any requirements.

A ball end 144 on the end of the shaft 135 affords a handle through which the yoke 134, together with its gears 132 and 136, can be shifted into the plane of either of the gears 141 to 143, the shaft 135 having annular marking grooves 145 to indicate the selected speed, and also having a stop collar 146 limiting the inward movement of the shaft 135.

When the gear 136 has been brought into the plane of either selected gear 141, 142 or 143, the yoke must be swung laterally to bring the gear 136 into mesh with the selected gear. This is provided for by an arcuate plate 147 which affords support for the outer end of the shaft 135 and is free to swing in the arcuate slot 137. Depending from this plate 147 is a hub 148 having a sleeve extension 149 in which is housed a locking plunger 151. The plunger is normally urged into any one of a series of locking holes 152 in the face of the removable plate 116 by a spring 153, bearing at one end against a collar on the locking plunger 151, and at the other end against the end of the sleeve extension 149. A cylindrical cap 154 engages over the sleeve extension 149 and is joined to the locking plunger 151, whereby upon outward pulling motion of the cap 154 the locking plunger 151 can be retracted from its engagement in the locking holes 152. The cap 154 also serves as a handle for swinging the member 147, and thereby the gear 136, upwardly or downwardly into mesh with the selected gear on the shaft 98. The holes 152 retain the gears in mesh in their selected gear ratio.

Figure 2:
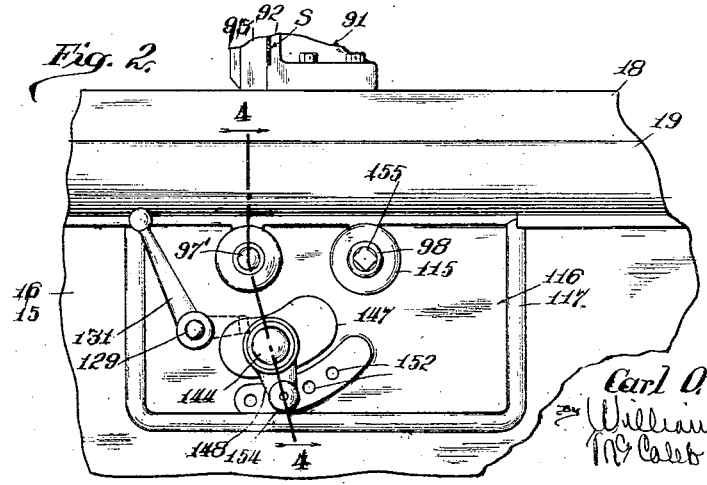
Figure 2 is a fragmentary elevational view of the front of the machine, viewed from the plane 2—2 of Figure 1.

It will be noted from Figures 2 and 5 that the forward end of the shaft 98 has a squared projecting end 155 for the reception of a suitable wrench, such as the same wrench for engaging the squared shanks 68. By manually rotating the shaft 98 in this manner, the corrugating and backing wheels can be rotated to facilitate the insertion of the strip.

Mounted on the shaft 98 between the bearing hubs 112 and 113 is a worm 156 for driving the corrugating wheels. Also mounted on this shaft between the bearing hubs 108 and 109 is a second worm 157 for driving the backing wheels, the corrugating wheels and backing wheels thus being driven in synchronism. The driving connection between the latter worm 157 and the backing wheels is illustrated in Figure 7, from a description of which the driving connection for the corrugating wheels will be apparent. The worm 157 meshes with a worm wheel 158 keyed on the lower end of a vertical drive shaft 159' which drives the backing wheel 61'. The raised table portion 18 is formed with a depending bearing 161 in which are secured bearing sleeves 162 for mounting the shaft 159'. The lower reduced end 163 of this drive shaft is also journalled in a bearing 164 in the bearing hanger 102. Keyed to the drive shaft between the worm wheel 158 and the bearing 161 is a spur gear 165 which meshes with a corresponding spur gear 166 secured to the lower end of the drive shaft 159 for the other wheel 61. This latter drive shaft is mounted in another depending bearing 162, similar to the bearing for the first-mentioned shaft 159'. Above the table 18 each shaft is provided with a collar 167 over which is placed the backing wheel 61—61', a nut 169 securing the wheel to the shaft. The underside of each backing wheel is provided with an annular groove for receiving the races of a thrust ball bearing 184 which bears on the elevated table portion 18 and carries the thrust and vibrating incident to the engagement of the cutter teeth on the portion of strip supported by the wheel. The locking wheel teeth may be formed directly on the periphery of this wheel, but for accommodating an adjusting ring 186 I prefer to form these teeth on a ring 188 which is secured to the top of the wheel proper. The purpose of the adjusting ring 186 is to adapt the backing wheel to the milling of strip of different widths. The periphery of the backing wheel is cut down to form an annular recess 185 leaving a lower shoulder 185' (Figure 8). The adjusting ring 186 is dropped down into this recess and rests on the shoulder 185'. This ring has an abutment shoulder 187 against which the lower edge of the strip bears. The toothed ring 188 is then secured over the adjusting ring 186 in an individual recess on the upper face of the wheel, being secured to the wheel by screws 189 (Figure 1). When strip of narrower width is to be milled, the ring 186 is substituted by a different ring in which the shoulder 187 is at higher level for backing up the lower edge of the strip and still presenting the upper edge in proper position to the cutter. Backing wheel teeth may be formed on this adjusting ring, but it is preferable that they be formed on the separate ring 188. If desired, the shoulder portions 185' may be proportioned to contact between the feeding wheels 61 and 61' and thereby afford rolling contacting surfaces for carrying part of the lateral pressure imparted to the backing wheels 61—61' in the cutting operations.

The drive to the two corrugating wheels 95—95' is generally similar to that described for the feeding and backing wheels 61—61'. The corrugating wheels are mounted on shafts 171 and 171', the latter shaft extending down through a bearing 172 in the bearing hanger 103, for mounting a worm wheel which meshes with the worm 156. The two corrugating wheels may be geared together by gears disposed below the table top, but this is not essential as the wheels are primarily gears, the teeth of which mesh through the strip s. According to the preferred mode of operation, the wheels 61 and 61' function as feeding and backing wheels; and for performing the feeding function it is necessary that they be driven; but it is conceivable that they may also operate merely as idler wheels for backing up and guiding the strip, in which case the drive thereto would be dispensed with.

As I shall presently describe in discussing the operation of the machine, the practice of presenting a bowed portion of the strip to the cutter enables the tensional strength of the side portions of the curve and the locked engagement of the strip in the teeth of the backing wheel to oppose great resistance to lateral deflection of the strip outward from the backing wheel under the downward and outward sweep of the cutter teeth. Nevertheless, it may be desirable to supplement this resistance to lateral deflection by additional means. I have shown such additional means in the form of an adjustable arcuate guide 177 mounted directly below each milling cutter and embracing a portion of its respective backing wheel. This guide contacts with the outer surface of the corrugated strip below the point of cutting, as shown in Figure 7, the central portion of the guide being cut down to just clear the sweep of the cutter teeth. Each guide is interchangeably carried on a slide 178 which is adjustable on a T-shaped slide rail 179 formed integral with the base casting. An adjusting screw 181 operates to give minute adjustment of the slide along this rail, and the slide is rigidly held in any adjusted position by the lateral clamping screws 182.

Having thus described the construction of the machine, I shall now describe the operation thereof, making particular reference to the milling operations and the manner in which burrs and other irregularities are avoided.

It will be observed that during each of the foregoing milling operations the strip is being moved through a curved path past the cutter, which is an important factor in avoiding burrs and uneven throats. Another factor contributing to the smoothness and uniformity of cut is the disposal of the cutter on an axis which is substantially parallel with the plane of the strip edge upon which it operates, or, at any rate, so disposed that the edges of the cutter engage the upper edge of the tip and sweeps downwardly through the same.

Relative to the step of moving the strip through a curved path, it will be noted that the downward sweep of the cutter teeth exerts a force on the strip tending to move it from its normal path. This force may be resolved into two components, one acting edgewise of the strip and the other at right angles to the face of the strip. The edgewise component is, of course, resisted by the bottom disc 168 under the backing wheel. The lateral component follows from the outward sweep of the cutter teeth away from the backing wheel. While each cutter tooth is cutting through the material in this part of its arc it tends to pull the strip away from the normal path, and if not resisted, the resulting variation in the path of the strip will tend to cause burrs and uneven cutting. However, by moving the strip through a curved path—or presenting a bowed portion of the strip to the cutter—this lateral force component is resisted by the tensional strength of the side portions of the curve and by the locked engagement of the strip in the teeth of the backing wheel. This characteristic of the curved strip in resisting the lateral force component is of importance even where the arcuate guide 177 is employed.

In being presented to the milling cutter the strip is solidly reenforced in the rear by the teeth of the backing wheel 61. These teeth extend up into close proximity to the arc of the cutter teeth so that the strip is supported up to the point of cutting, from which point the teeth are sloped back as above described. A particular advantage accrues to the practice of having each corrugation which protrudes toward the cutter substantially filled with a backing wheel tooth. This tooth locks the corrugation against the tendency to flatten or spread under the lateral pressure of the cutter teeth. Moreover, the feed of the strip is thus through the positively engaging surfaces of the corrugation and of the backing tooth, instead of by endwise pulling of the strip past the cutter, which in itself tends to flatten the corrugations.

Another advantage inherent in presenting a bowed portion of the strip to the cutter is that because of the bowed contour the sweep of the cutter teeth will cut each throat $j$ down to more of a point, approaching the form of a V bottom. This reduces the tendency for burrs or webs to remain at the bottoms of the throats, which is more pronounced where the bottom is more rounded.

By disposing the cutter on an axis which is substantially parallel with the plane of the strip edge upon which it operates, the cutting edges of the milling tool traverse a circular path which intercepts the strip edgewise. In their downward sweep the cutter teeth successively engage the strip at a point in or beyond the median plane of the edge thereof and leave or disengage the strip at one side and between the edges thereof. This disposal of the cutter produces a "hollow" cut in the strip, leaving sides of slightly concave section. Such a cut results in sharper tooth points and assists in avoiding burrs and uneven throats. This disposal and direction of rotation of the cutter also result in the cutter teeth completing their shearing operation or breaking contact with the strip down below the bottoms of the throats along the side of the strip, which also aids in avoiding burrs or other unevenness in the throats $j$ or at the points $k$.

The finished product is illustrated in Figures 9 and 10. It will be noted that the throats $j$ are relatively sharp in form, as above stated, and relatively free of any burrs or jagged edges. This also applies to the tooth points $k$. By virtue of this absence of burrs and other irregularities I do not need to subject the strip constructed in accordance with my invention to the action of clearing dies or any other mechanism for clearing up the strip and placing it in finished form.

The foregoing method of cutting the edge of corrugated fastener strip has been made the subject matter of my copending application mentioned in the forepart of this description.

While I have shown but this particular embodiment of my invention, it is to be understood that many changes may be made therein without departing from the spirit or scope of the invention.

What I claim is:

1. In a machine of the class described, the combination of means for corrugating the stock strip, means for moving the strip through a curved path, and means for milling the edge thereof while said strip is moving through a curved path.

2. In a machine of the class described, the combination of means for corrugating the stock strip, means for cutting the edge of the strip, and means for guiding that portion of the strip being cut in a curved path during said cutting operation.

3. In mechanism for milling the edge of corrugated strip, the combination of cutting means, and means for guiding the strip in a curved path past said cutting means.

4. In mechanism for milling the edge of corrugated strip, the combination of cutting means, and a wheel for guiding that portion of said strip being cut in a curved path during said cutting operation.

5. In mechanism for milling the edge of corrugated strip, the combination of cutting means, and a curved backing member for backing the portion of said strip being cut during the cutting operation.

6. In mechanism for milling the edge of a corrugated strip, the combination of cutting means, and a toothed wheel, located adjacent the cutting means and on the opposite side of the strip therefrom, meshing with the corrugations in that portion of said strip being cut for backing up the strip and moving it through a curved path during the cutting operation.

7. In a machine of the class described, the combination of means for corrugating the stock strip, a milling cutter, a toothed wheel meshing with the corrugations in said strip opposite the cutting means and feeding said strip past said milling cutter, and means for driving said wheel.

8. In a machine of the class described, the combination of means for corrugating the stock strip, two milling cutters, and an individual guide wheel for each of said cutters for guiding the corrugating strip in a curved path past each cutter, each of said guide wheels being located adjacent its associated cutter and on the opposite side of the strip from said cutter.

9. In a machine of the class described the combination of means for corrugating a stock strip, a first milling cutter, a cooperating feeding wheel receiving the corrugated strip and remaining in contact therewith while feeding it past said cutter, a second milling cutter for cutting the other side of said strip, a cooperating feeding wheel for engaging and remaining in contact with said strip while feeding it past said second milling cutter, and means for driving said milling cutter and said feeding wheels.

10. In a machine of the class described, the combination of supporting means a pair of corrugating wheels, a strip corrugated by said corrugating wheels, a pair of feeding wheels, a pair of milling cutters, one opposite each of said feeding wheels, means for driving the feeding wheels so as to guide the strip first over one of said wheels with one face engaged by the opposite cutter and subsequently over the other feeding wheel, with its opposite face engaged by the cutter opposite to the second wheel.

11. In a machine of the class described, the combination of a milling cutter, means for feeding corrugated strip past said milling cutter in a curved path substantially tangential to the cylinder defined by the rotating teeth of the cutter, and means for shifting said milling cutter longitudinally of its cutting position.

12. In a machine of the class described, the combination of a support, a milling cutter, means for feeding a corrugated strip to said milling cutter in a curved path substantially tangential to the cylinder defined by the rotating teeth of the cutter for cutting one edge of said strip, a mounting unit for said cutter, and guide means for mounting said unit on said support, said guide means permitting shifting motion of said mounting unit to change the position of said cutter.

13. In a machine of the class described, the combination of a base, a milling cutter, means for feeding corrugated strip to said cutter in a curved path substantially tangential to the cylinder defined by the rotating teeth of the cutter, said cutter milling the edge of said strip, an arbor for said milling cutter, and a support for said arbor, said support being movable relative to said base.

14. In a machine of the class described, the combination of a base, a raised table portion on said base, guide wheels supported on said raised table portion for guiding a strip, and milling cutters supported on said base for engaging said strip at the wheels while the strip is being guided by said wheels.

15. In a machine of the class described, the combination of a base comprising a raised table portion, backing wheels for guiding a corrugated strip, said wheels being mounted on said raised table portion, mounting units adjustably supported on said base to either side of said raised table portion, and milling cutters carried by said mounting units and adapted for milling the strip at the wheels while said strip is in engagement with said backing wheels.

16. In a machine of the class described, the combination of means for milling the edge of a corrugated strip, a backing wheel for guiding the strip past said milling means, said wheel being disposed adjacent the milling means and on the opposite sides of the strip therefrom, and a thrust surface disposed on one side of said wheel for receiving the thrust imposed upon the corrugated strip from said milling means.

17. In a machine of the class described, the combination of a milling cutter, a toothed backing wheel for guiding a corrugated strip in a curved path past said cutter, said wheel acting on the face of the strip opposite the milling cutter and adjacent the same, and a disk below said wheel for receiving the down thrust imposed on said strip from the action of said milling cutter.

18. In mechanism for milling the edge of corrugated strip, the combination of a backing wheel, a milling cutter, the wheel being disposed adjacent to the cutter and acting on the face of the strip which lies away from the cutter, and an arcuate guide embracing a portion of said backing wheel on the outside of the strip directly below said milling cutter.

19. In mechanism for milling the edge of corrugated strip, the combination of a milling cutter, a backing wheel adapted to receive the strip and move it in a curved path past said milling cutter for milling one edge thereof, the wheel being disposed adjacent the cutter and acting on the face of the strip which lies away from the cutter, and a shoulder rotating with said backing wheel for backing up the other edge of said strip.

20. In mechanism for milling the edge of corrugated strip, the combination of a milling cutter, a backing wheel adapted to receive the strip and move it in a curved path past said milling cutter for milling one edge thereof, the wheel being disposed adjacent the cutter and acting on the face of the strip which lies away from the cutter, and a ring carried by said backing wheel comprising a shoulder adapted to back up the other edge of said strip, said ring being adapted for ready substitution by other rings having their shoulders at different heights.

21. In mechanism for milling the edge of corrugated strip, the combination of a milling cutter, a backing wheel adapted to receive the strip and move it in a curved path past said milling cutter for milling one edge thereof, the wheel being disposed adjacent the cutter and acting on the face of the strip which lies away from the cutter, said backing wheel having a shouldered recess formed around its periphery, a backing ring receivable in said recess, said backing ring having an annular shoulder adapted to back up the other edge of said strip, said ring being adapted for ready substitution by other rings having backing shoulders at different heights, and a toothed ring detachably secured to said backing wheel and overlying said backing ring.

22. In an apparatus of the class described, a milling cutter and means for moving a corrugated strip past and in engagement with said cutter while in bowed formation the better to resist the lateral force component of the stress exerted on the strip by the cutter teeth.

23. In an apparatus of the class described, a milling cutter for acting upon an edge of a corrugated strip, means for moving the strip past the cutter, and means continuously maintaining the strip portion being milled in bowed formation.

24. In an apparatus of the class described, a milling cutter for acting upon an edge of a corrugated strip, means for moving the strip past the cutter, and means continuously maintaining the strip portion being milled in bowed formation with the convex surface of the bow presented to the cutter.

In witness whereof, I hereunto subscribe my name this 17th day of September, 1924.

CARL O. SWENSON.